Aug. 29, 1967    A. A. YOUNG    3,338,655
COMBINATION FLAT AND CONVEX OUTSIDE REAR
VIEW MIRROR FOR VEHICLES
Filed Nov. 29, 1963    2 Sheets-Sheet 1

INVENTOR.
ALMON A. YOUNG.
BY
ATTORNEYS

Aug. 29, 1967        A. A. YOUNG        3,338,655
COMBINATION FLAT AND CONVEX OUTSIDE REAR
VIEW MIRROR FOR VEHICLES
Filed Nov. 29, 1963        2 Sheets-Sheet 2

INVENTOR.
ALMON A. YOUNG
BY
ATTORNEYS

United States Patent Office 3,338,655
Patented Aug. 29, 1967

3,338,655
COMBINATION FLAT AND CONVEX OUTSIDE
REAR VIEW MIRROR FOR VEHICLES
Almon A. Young, 301 Gateway,
Pontiac, Mich. 48054
Filed Nov. 29, 1963, Ser. No. 326,965
1 Claim. (Cl. 350—293)

This application relates to duplex mirrors, i.e., mirrors comprising flat mirrors combined with convex mirrors; and more particularly to outside side view duplex mirrors useful for trucks and similar large vehicles and particularly and most especially useful for right side mounting in a standard or left side drive vehicle.

An object of the present invention is to provide an improved form of duplex mirror as well as an improved method of making the same.

The foregoing and other objects of the invention will become apparent upon reading the following description of which tthe attached drawings form a part.

Figure 1:
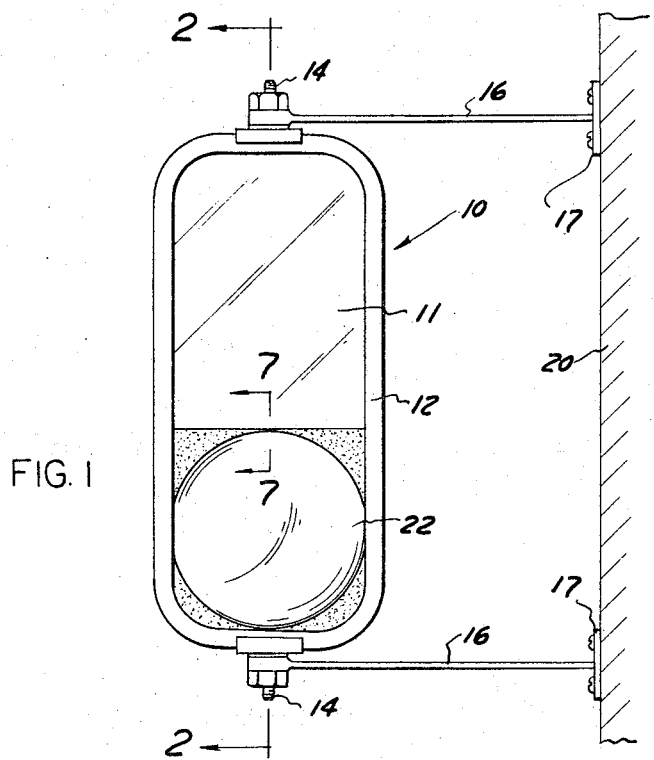
FIG. 1 is an elevational view of the side view duplex mirror hereof, shown mounted.
Figure 2:
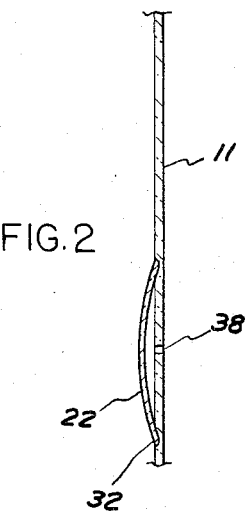
FIG. 2 is a cross-sectional view taken in the direction of the arrows 2—2 of FIG. 1, with the view being fragmentary and omitting frame and mounting means.
Figure 3:
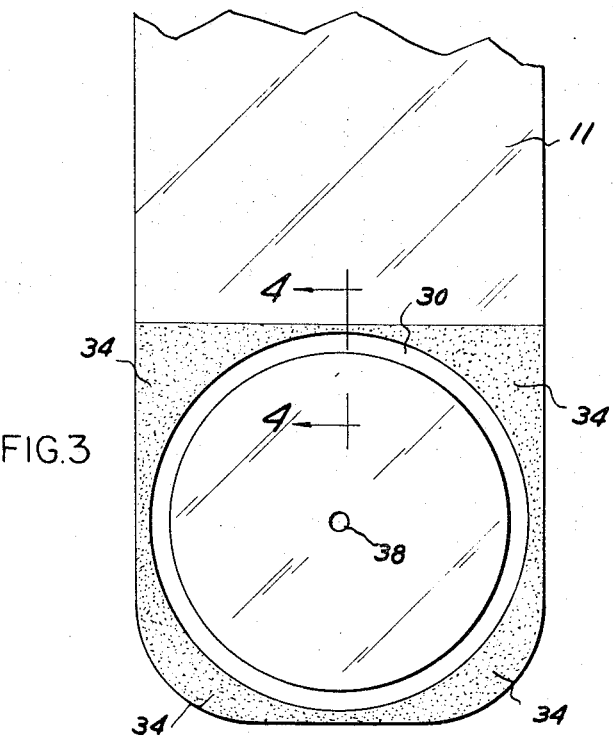
FIG. 3 is an enlarged scale fragmentary elevation view of the flat mirror per se.

The duplex mirror 10 hereof includes a vertically mounted frame 12 whose upper and lower ends have studs 14 for mounting arms 16 secured to brackets 17 on the side or cab 20 of the truck.

The flat mirror 11 has in its lower end a convex round mirror 22.

Specific attention will be directed to the details of joining the convex mirror 22 to the flat mirror 11.

The flat mirror 11 has a large diameter, shallow, adhesive containing, ground depression 30. The round convex mirror 22 is thin and is forward of the flat mirror and has its rear surface 31 silvered and concaved and its rear edge 32 ground flat and monoplanar, as shown best in FIG. 8, and such edge is seated and adhesively secured in the depression 30 by any suitable adhesive.

The round convex mirror 22 is of a diameter substantially equal to the width of the flat mirror. The flat mirror is ground as indicated to be non-reflective in the four quadrants 34 around the round convex mirror.

The method for making the mirror above described comprises the following steps.

Figure 7:
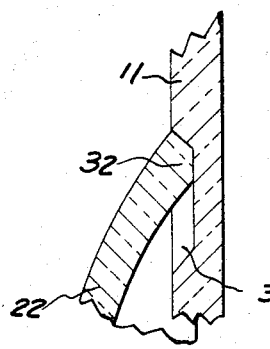
FIG. 7 is an enlarged section view as if on line 7—7, FIG. 1.
Figure 8:
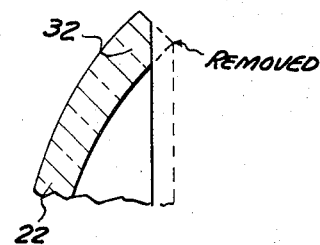
FIG. 8 is an enlarged fragmentary section view of the edge part of a convex mirror per se.

Depression 30 is ground in the flat mirror to the form above described. The rear edge 32 of the convex mirror is also ground to the form above described as shown in FIGS. 7 and 8. Adhesive is applied to either the depression 30 or to the rear edge 32 of the convex mirror, as described, or to both. The convex mirror is then laid in the depression to secure the convex mirror to the flat mirror adhesively.

Figure 4:
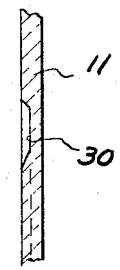
FIG. 4 is a cross section view on line 4—4, FIG. 3.
Figure 5:
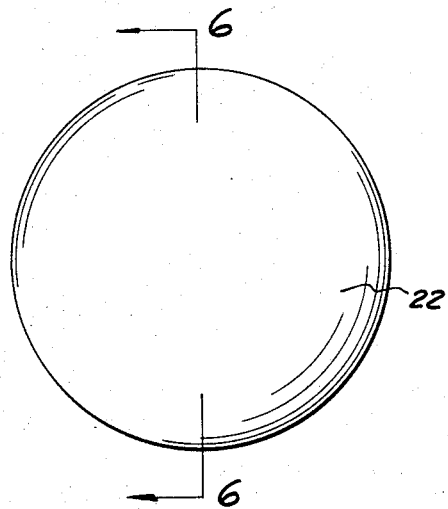
FIG. 5 is an elevation view of the convex mirror, per se.
Figure 6:
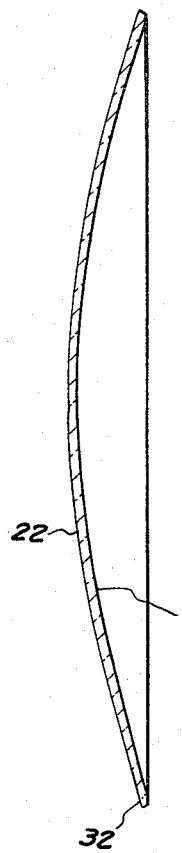
FIG. 6 is an enlarged section view as of on line 6—6, FIG. 5.

Preferably the depression in the flat mirror is a wide annular groove substantially as shown in FIG. 4.

It will be observed that for venting the space between the convex mirror 22 and the flat mirror 11 there is provided a vent hole 38.

The dimensions of the preferred embodiment, as shown in the drawing, are here given.

The flat mirror is approximately .125 inch thick; six inches wide; and of any desired length, preferably 15 inches.

The round mirror is convexed on a 10 inch radius, is preferably six inches diameter and is preferably .070 inch thick.

The groove or seat or depression 30 is six inches diameter, ½ inch wide, and .040 inch deep.

The hole 38 is preferably ¼ inch diameter.

The round mirror is ground off at the rear edge as shown in FIG. 8 with approximately .036 inch thickness of stock removed at such edge.

The adhesive is preferably a fast setting permanent weather proof epoxy type adhesive.

It has been found that the mirror herein disclosed is superior optically and structurally to any known duplex mirror. It has been contemplated to provide duplex mirrors where the flat mirrors and the convex mirrors were integral; and it has also been contemplated to mount a convex, flat back, mirror on the forward surface of a flat mirror by adhesively securing the two together.

In the mirror construction herein disclosed the convex mirror is set into a shallow depression of the flat mirror and the rear edge of the convex mirror is ground off flat. Despite that the rear surface of the convex mirror is concaved, proper and suitable adhesion between the two mirrors is effected, with the outer edge of the flat mirror depression providing an anti-shifting abutment for the outer edge of the convex mirror and with the outer part of the convex mirror on the rear surface being ground flat and unsilvered as shown best in FIG. 8, silver being left on only the concave surface.

Not only is the construction hereof, from the point of view of structural relationship, superior in that a firm and adequate securing of the two mirrors is effected with the flat mirror seating or nesting, and also protecting the edge of, the convex mirror, but in addition the seating of the convex mirror within a seat or nest of the flat mirror provides an improved optical result that has been found to be extremely satisfactory in operation as contrasted from mirrors where a convex mirror is secured to the forward surface of a flat mirror by mechanical means or by adhesive.

Now having described the combined mirror herein disclosed, reference should be had to the claim which follows.

I claim:

A duplex mirror comprising a flat mirror of oblong shape adapted to be mounted with its long dimension vertical and having at its lower end a large circular shallow, adhesive containing, flat bottomed ground depression of a diameter substantially equal to the width of the flat mirror whose angular edge is tapered, smaller at the bottom of the depression than at the opening of the depression;

and a thin round convex mirror of a diameter substantially equal to the width of the flat mirror and positioned forward of and at the lower end of said flat mirror in said depression; and adhesively secured in said depression by the adhesive therein;

the convex mirror having its rear concaved and its edge ground away partly so that the rear surface of the round mirror at such edge is flat and monoplanar;

the flat mirror being ground to be non-reflective in the four quadrants around the round convex mirror;

the peripheral edge of the convex mirror being substantially normal to its outer surface and intersecting said flat ground rear surface of the round mirror to provide for it two obtuse angularly related support surfaces, one being the edge and the other the rear surface at such edge;

said ground depression including corresponding angularly related monoplanar or flat bottom and outwardly expanding tapered edge portions adapted for cooperative supporting and securing registry and engagement with the support surfaces of said round mirror.

References Cited

UNITED STATES PATENTS 3,104,274  9/1963  King _____ 88—86 X

JEWELL H. PEDERSEN, *Primary Examiner.*

W. L. SIKES, *Assistant Examiner.*